(12) United States Patent
Bauer et al.

(10) Patent No.: US 8,539,754 B2
(45) Date of Patent: Sep. 24, 2013

(54) METHOD FOR AN EMISSION-OPTIMIZED TRANSFER FROM A MODE OF AN INTERNAL COMBUSTION ENGINE TO ANOTHER MODE

(75) Inventors: Erwin Bauer, Lappersdorf (DE); Dietmar Ellmer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 382 days.

(21) Appl. No.: 12/920,174

(22) PCT Filed: Mar. 2, 2009

(86) PCT No.: PCT/EP2009/052438
§ 371 (c)(1),
(2), (4) Date: Oct. 27, 2010

(87) PCT Pub. No.: WO2009/109540
PCT Pub. Date: Sep. 11, 2009

(65) Prior Publication Data
US 2011/0047967 A1    Mar. 3, 2011

(30) Foreign Application Priority Data
Mar. 5, 2008    (DE) .......................... 10 2008 012 612

(51) Int. Cl.
*F01N 3/00*    (2006.01)
(52) U.S. Cl.
USPC .............. 60/274; 60/285; 60/286; 123/298 F; 123/299; 123/305
(58) Field of Classification Search
USPC ................ 60/274, 284, 285, 286; 123/27 R, 123/198 F, 295, 299, 300, 305, 481
See application file for complete search history.

(56) References Cited

U.S. PATENT DOCUMENTS

| 6,336,436 B1 | 1/2002 | Miyakubo et al. ............ 123/295 |
| 6,354,264 B1 * | 3/2002 | Iwakiri et al. ................. 123/305 |

(Continued)

FOREIGN PATENT DOCUMENTS

| DE | 102006060818 A1 | 9/2007 |
| EP | 1 085 192 A2 | 3/2001 |

(Continued)

OTHER PUBLICATIONS

International PCT Search Report and Written Opinion, PCT/EP2009/052438, 17 pages, Mailed Feb. 19, 2010.

*Primary Examiner* — Binh Q Tran
(74) *Attorney, Agent, or Firm* — King & Spalding L.L.P.

(57) ABSTRACT

In a method for an emission-optimized transition between a spark-ignition mode of an internal combustion engine and a self-ignition mode of the internal combustion engine, the internal combustion engine is operated in the preparation phase and chronologically before the transition of modes in a spark-ignition mode in at least one cylinder cycle with a rich mixture ($\lambda<1$) and, subsequently, in the same cylinder cycle with a lean mixture ($\lambda<1$). After that, the internal combustion engine is operated in the self-ignition mode. In a method for an emission-optimized transition between a self-ignition mode of an internal combustion engine and a spark-ignition mode of the internal combustion engine, in a transition phase of the operation modes and during a last cycle of the self-ignition mode and/or a first cycle of the spark-ignition mode, fuel is post-injected into at least one combustion chamber of the internal combustion engine.

32 Claims, 2 Drawing Sheets

(56) References Cited

U.S. PATENT DOCUMENTS

| | | | |
|---|---|---|---|
| 6,543,220 B2 * | 4/2003 | Yoshida et al. | 60/285 |
| 6,772,585 B2 * | 8/2004 | Iihoshi et al. | 60/277 |
| 7,343,902 B2 * | 3/2008 | Brevick et al. | 123/481 |
| 7,487,852 B2 | 2/2009 | Leone et al. | 180/65.2 |
| 7,730,717 B2 * | 6/2010 | Ogawa et al. | 60/285 |
| 7,866,148 B2 * | 1/2011 | O'Neill | 60/324 |
| 2007/0289571 A1 | 12/2007 | Petridis et al. | 123/305 |

FOREIGN PATENT DOCUMENTS

| | | |
|---|---|---|
| EP | 1085192 A3 | 7/2003 |
| JP | 2003 343313 A | 12/2003 |
| WO | 2004/076831 A2 | 9/2004 |
| WO | 2004/076831 A3 | 9/2004 |
| WO | 2005/035953 A1 | 4/2005 |

* cited by examiner

METHOD FOR AN EMISSION-OPTIMIZED TRANSFER FROM A MODE OF AN INTERNAL COMBUSTION ENGINE TO ANOTHER MODE

CROSS-REFERENCE TO RELATED APPLICATIONS

This application is a U.S. National Stage Application of International Application No. PCT/EP2009/052438 filed Mar. 2, 2009, which designates the United States of America, and claims priority to German Application No. 10 2008 012 612.8 filed Mar. 5, 2008, the contents of which are hereby incorporated by reference in their entirety.

TECHNICAL FIELD

The invention relates to a method for an emission-optimized transfer between a spark-ignition mode of an internal combustion engine and a self-ignition mode, as well as a method for the emission-optimized transfer between the self-ignition mode and the spark-ignition mode of the internal combustion engine. The invention further relates to a control device, by means of which a method according to the invention may be carried out.

BACKGROUND

A modern internal combustion engine is able to encompass different operating modes—so-called combined combustion processes—and different operating strategies. Thus an appropriately equipped spark-ignition engine is able to be operated, for example, in a stratified mode or in a homogenous mode. A CAI-capable (Controlled Auto Ignition) spark-ignition engine is able to be operated in specific operating ranges in a (controlled) self-ignition mode. Outside these operating ranges, an air-fuel mixture of the spark-ignition engine is spark-ignited in the conventional manner in so-called SI mode (spark ignition). An HCCI-capable (Homogenous Charge Compression Ignition) diesel engine permits, in a similar manner to the CAI-capable spark-ignition engine, combustion of a homogenous air-fuel mixture, the combustion starting almost simultaneously in the entire combustion chamber. An internal combustion engine with a variable valve train permits different operating strategies and/or modes for the purposes of final throttling, for example so-called early closing of the inlet (EIC mode: Early Inlet Closing) or so-called late closing of the inlet (LIC mode: Late Inlet Closing).

Transferring between the modes is technically challenging, in particular when a digital valve lift changeover is connected thereto. This is the case, for example, when transferring from SI mode to CAI mode of the internal combustion engine, as a CAI-combustion method for igniting a homogenous, lean air-fuel mixture requires a large quantity of residual gas which is produced, for example, by retaining exhaust gas from a previous combustion cycle. This is achieved by means of a corresponding profile of an outlet camshaft with a suitable valve lift and suitable phase position. In this connection, a changeover to a small valve lift is carried out on the outlet side, by which residual gas remains in a relevant combustion chamber of the internal combustion engine. It is also possible to conduct the residual gas by exhaust gas recirculation into the relevant combustion chamber of the internal combustion engine.

For reasons of comfort, a transfer between modes which is smooth and thus neutral in terms of torque is desirable. In other words, the effective engine torque has to be kept constant before and after the transfer between modes. When transferring between an SI mode and a CAI mode, this is achieved as follows: in order to achieve a pressure level in an intake manifold which is desirable for the CAI mode, a throttle flap is opened (final throttling). At the same time, an ignition angle is retarded in order, in the case of a constant air-fuel ratio, to reduce engine torque which is generated due to extra inflowing air and fuel which has been introduced (EIC mode). The retardation of the ignition leads to a marked increase in the exhaust gas temperature. With a changeover from the conventional SI mode simply into EIC mode, which is also spark-ignited, such a method is entirely practicable. However, should the mode be transferred to the CAI mode, the exhaust gas temperature has to be reduced before the transfer, as otherwise a subsequent CAI-combustion takes place too early, which results from a high charge temperature. The high charge temperature occurs due to the mixing of the hot, retained residual gases, a quantity of fresh air which has been drawn in and a quantity of fuel which has been introduced.

Premature ignition of the air-fuel mixture leads to knocking of the internal combustion engine, which has to be avoided at all costs to protect the internal combustion engine. Noise emissions are also produced by the knocking. Remedies are provided by less fuel being injected in EIC mode and the ignition angle being advanced to compensate for the torque. As a result, the air-fuel mixture shifts in the lean direction. This leads, however, to an increase in the nitrogen oxides produced during combustion. As CAI-combustion engines generally do not have an SCR-catalytic converter but only a conventional three-way catalytic converter, each transfer from the SI mode to the CAI mode brings the drawback of (nitrogen oxide) emissions. The emissions behavior of the internal combustion engine is thus impaired over the long term. Moreover, a transfer between the CAI mode and the SI mode, results in negative emissions behavior of the internal combustion engine as, for stoichiometric operation (SI mode) of the internal combustion engine, a lean residual gas of the CAI mode is produced and has to be removed from the relevant combustion chambers.

SUMMARY

According to various embodiments, an improved method for transfer between a spark-ignition mode of an internal combustion engine and a self-ignition mode can be provided. According to other embodiments, an improved method for transfer between the self-ignition mode and the spark-ignition mode of the internal combustion engine can be provided.

According to an embodiment, in method for an emission-optimized transfer between a spark-ignition mode, in particular an SI mode, of an internal combustion engine, and a self-ignition mode, in particular a CAI mode, of the internal combustion engine, the internal combustion engine may be operated in the preparation phase and chronologically before the transfer of modes in a spark-ignition mode in at least one cylinder cycle with a rich mixture and, subsequently, in the same cylinder in at least one cycle with a lean mixture, and the internal combustion engine may be subsequently operated in the self-ignition mode.

According to a further embodiment, the number of cycles of the preparation phase, in which the internal combustion engine is operated with a rich mixture, may be dependent on the nature, in particular the capacity for storage, of a catalytic converter and may be preferably two or three cycles. According to a further embodiment, a number of cycles of the preparation phase, in which the internal combustion engine is operated with a lean mixture, may be dependent on the nature, in particular the capacity for storage, of the catalytic converter and preferably may be one or two cycles. According to a further embodiment, in the respective cycles of the preparation phase a relevant lambda value of the internal combustion engine may be selected so that for the entire preparation phase an average lambda value of approximately 0.95 to approximately 1.04, in particular of 0.97 to 1.02, in particular preferably of 0.98 to 1.01 and, in particular, particularly preferably of 0.99 to 1.00 results. According to a further embodiment, a quantity of fresh air introduced into the internal combustion engine may be considered when determining the average lambda value. According to a further embodiment, in at least one portion of the cycles of the preparation phase, in which the internal combustion engine is operated with a rich mixture, a lambda value of the relevant cycle may be approximately 0.7 to approximately 0.95, in particular approximately 0.8 to 0.9 and, in particular, preferably approximately 0.9 to approximately 0.95. According to a further embodiment, the rich cycle of the preparation phase, which immediately precedes a lean cycle, may be run with a mixture which is richer than a mixture in a previous rich cycle and/or which is as rich as possible. According to a further embodiment, in a cycle of the preparation phase in which the internal combustion engine can be operated with a lean mixture, a lambda value of the relevant cycle can be greater than approximately 1.3, and preferably approximately 1.4 to 2, in particular approximately 1.6 to approximately 1.8. According to a further embodiment, the final cycle chronologically of the preparation phase can be run with a lean mixture so that for a subsequent combustion in the self-ignition mode a residual gas temperature is achieved which is as optimal as possible. According to a further embodiment, the smooth-running of the internal combustion engine may be considered and/or misfires avoided, when setting a residual gas temperature which is as optimal as possible. According to a further embodiment, a lambda value of a cycle, which chronologically precedes the preparation phase, may be approximately 1.0.

According to another embodiment, in another method for an emission-optimized transfer between a self-ignition mode, in particular a CAI mode, of an internal combustion engine, and a spark-ignition mode, in particular an SI mode, of the internal combustion engine, in a transfer phase of the modes and during a last cycle of the self-ignition mode and/or during a first cycle of the spark-ignition mode, fuel may be post-injected into at least one combustion chamber of the internal combustion engine.

According to a further embodiment of the another method, a post-injection of fuel may take place chronologically after a final self-ignition. According to a further embodiment of the another method, the post-injection of fuel into the combustion chamber can be adjusted so that: residual oxygen is partially absorbed by an oxidation of fuel components already in the combustion chamber and/or at least partially absorbed in an exhaust manifold of the internal combustion chamber, and/or by the post-injection no active contribution to the torque of the internal combustion engine is made, and/or the post-injection takes place in a manner which is neutral in terms of torque and/or at the start of the post-injection an outlet valve of the combustion chamber is still closed or already open. According to a further embodiment of the another method, a contribution by the post-injection to a torque of the internal combustion engine may be compensated for by modifying the main injection. According to a further embodiment of the another method, the number of cycles of the transfer phase in which the internal combustion engine is operated with a lean mixture, may be dependent on the nature, in particular a capacity for storage, of a catalytic converter and may be preferably one or two cycles. According to a further embodiment of the another method, the number of cycles of the transfer phase in which the internal combustion engine is operated with a rich mixture can be dependent on the nature, in particular the capacity for storage, of the catalytic converter and is preferably two or three cycles. According to a further embodiment of the another method, in the respective cycles of the transfer phase a relevant lambda value of the internal combustion engine can be selected so that for the entire transfer phase an average lambda value of approximately 0.93 to approximately 1.01, in particular of approximately 0.94 to 1.00, in particular preferably of 0.95 to 0.99 and, in particular, particularly preferably of 0.96 to 0.98 results. According to a further embodiment of the another method, a quantity of fresh air introduced into the internal combustion engine may be considered when determining the average lambda value. According to a further embodiment of the another method, a lambda value of the last lean cycle of the self-ignition mode can be approximately 1.1 to approximately 1.2. According to a further embodiment of the another method, a lambda value of a first rich cycle of the transfer phase may be as low as possible, and may be preferably approximately 0.7 to 0.9, in particular approximately 0.8 to approximately 0.9. According to a further embodiment of the another method, at least one cycle of the transfer phase which chronologically follows the first rich cycle may be operated with a rich mixture, and a lambda value may be preferably higher than that of the previous rich cycle, and is preferably approximately 0.8 to approximately 0.95, in particular approximately 0.85 to approximately 0.9. According to a further embodiment of the another method, a lambda value of a cycle, which chronologically follows the transfer phase, may be approximately 1.0.

According to a further embodiment of one of the methods mentioned above, the average lambda value of the entire preparation phase and/or transfer phase relating to a cylinder and/or to one respective cylinder or to a plurality of cylinders of the internal combustion engine, or the average lambda value of the entire preparation phase and/or transfer phase may relate to all cylinders of the internal combustion engine. According to a further embodiment of one of the methods mentioned above, the combustion products produced by at least one rich cycle and at least one lean cycle in the preparation phase and/or transfer phase may come into contact in an exhaust manifold of the internal combustion engine and may be at least partially mixed there. According to a further embodiment of one of the methods mentioned above, an adjustment of the at least one rich cycle and of the at least one lean cycle of the preparation phase and/or transfer phase can be adapted to the nature and/or the size of an exhaust gas cleaning device and/or of the exhaust manifold. According to a further embodiment of one of the methods mentioned above, the exhaust manifold of the internal combustion engine, in particular, may be formed in a portion upstream of the exhaust gas cleaning device so that it is possible for combustion products of different cylinders and/or successive cycles, preferably also of different cylinders, to be mixed there. According to a further embodiment of one of the methods mentioned above, a rich cycle and a lean cycle of the preparation phase and/or transfer phase of a cylinder or a plurality of cylinders of the internal combustion engine can be adjusted so that the combustion products produced come into contact with one another as early as possible in the exhaust manifold. According to a further embodiment of one of the methods mentioned above, the rich cycle and the lean cycle of the preparation phase and/or transfer phase can be adjusted so that there is no breakdown of carbon monoxide and/or hydrocarbons and/or nitrogen oxides downstream of the exhaust gas cleaning device, in particular downstream of a three-way catalytic converter, of the exhaust manifold. According to a further embodiment of one of the methods mentioned above, the pollutants produced during the preparation phase and/or transfer phase can be neutralized by reacting with one another in the catalytic converter. According to a further embodiment of one of the methods mentioned above, the internal combustion engine may operate during the preparation phase and/or chronologically after the transfer phase in an EIC mode. According to a further embodiment of one of the methods mentioned above, with a conventional ignition sequence of a four-cylinder internal combustion engine of cylinders one, three, four and two, the preparation phase and/or the transfer of the modes can be initiated chronologically first in cylinder four.

According to yet other embodiments, a control device, in particular engine control unit, may be configured to carry out one of the methods as described above.

BRIEF DESCRIPTION OF THE DRAWINGS

The invention is described in more detail hereinafter with reference to exemplary embodiments, referring to the accompanying drawings, in which.

DETAILED DESCRIPTION

Thus the transfer between the two modes, in particular an SI mode and a CAI mode, is intended to take place in a manner which is emission-optimized in both directions, in particular in a manner which is neutral in terms of emissions. In other words, as far as possible no additional pollutant emissions are intended to be produced. Moreover, the transfer according to various embodiments between the two modes of the internal combustion engine is intended to be carried out in a manner which is neutral in terms of torque.

According to various embodiments, for the transfer from the spark-ignition mode, in particular an SI mode of the internal combustion engine, to the self-ignition mode, in particular a CAI mode of the internal combustion engine, the exhaust gas temperature has to be reduced before the transfer and/or changeover between the two modes. This is preferably carried out by making the air-fuel mixture leaner in a combustion chamber of the internal combustion engine. To avoid a nitrogen oxide peak in the exhaust gas, the leaning is arranged chronologically before at least one rich cycle, which leads to a reduction of nitrogen oxide. According to various embodiments, in all cylinders of the internal combustion engine in a preparation phase before transferring between modes, at least one cycle is operated with a rich mixture, followed by at least one cycle with a lean mixture. Preferably, immediately afterwards the internal combustion engine then transfers to the self-ignition mode.

A substantial advantage of this method is that the transfer from the spark-ignition mode, in particular the SI mode, to the self-ignition mode, in particular the CAI mode, is carried out in a manner which is emission-optimized and/or neutral in terms of emissions. In other words, hardly any pollutant emissions or no additional pollutant emissions are produced when transferring between modes. The nitrogen oxides unavoidably produced when preparing for the transfer, have already been previously reduced by a specific formation of hydrocarbon and carbon monoxide components by a rich combustion in the exhaust manifold—i.e. in the catalytic converter or even upstream of the catalytic converter. A restriction relative to the torque neutrality which is required when transferring between modes thus does not exist.

According to various embodiments, during the changeover from the spark-ignition SI mode to the self-ignition CAI mode, as far as combustion technology is concerned (pollutant emissions, knocking), the exhaust gas temperature of the internal combustion engine is reduced at least in the last cycle chronologically before the changeover. As a result, the ejection of nitrogen oxide from the internal combustion engine increases. According to various embodiments, such a lean cycle may be run with a high level of excess air, in particular a level of excess air which is high as possible, in order to achieve a large reduction and/or a reduction which is as large as possible in the exhaust gas temperature. According to various embodiments, at least one combustion cycle prior to said at least one lean cycle is deliberately run as a rich cycle, in order to compensate for the pollutant emissions of the lean cycle with the pollutant emissions of the rich cycle(s).

With more than one previous rich cycle according to various embodiments an enrichment takes place which increases over time, so that the richest cycle is as close as possible chronologically to the at least one lean cycle and thus the requirements for efficient mixing of the reaction partners (fuel emissions) in the exhaust manifold and the catalytic converter contained therein are achieved. In the preparation phase, at least one lean cycle follows a rich cycle or as many as a plurality of rich cycles, it being preferred that an average lambda value of all cycles in the preparation phase is approximately 0.99 to approximately 1.00. The number of relevant rich and lean cycles thus depends considerably on the storage capacity of an exhaust gas cleaning system and, in particular as regards the rich cycles, may be as many as ten to 20. Preferably, however, a maximum of five rich and a maximum of three lean cycles are preferred.

For a transfer from the self-ignition mode, in particular the CAI mode, of the internal combustion engine, to the spark-ignition mode, in particular the SI mode, in at least one cycle of a transfer phase between the modes of the internal combustion engine, a post-injection takes place into a combustion chamber of the internal combustion engine. By such an enrichment according to various embodiments, in particular a lean and/or a slightly rich cycle of the transfer phase, nitrogen oxide peaks are again avoided, as said nitrogen oxide peaks are prevented by rich cycles arranged downstream and a resulting reduction in nitrogen oxide. Preferably, the post-injection takes place chronologically after self-ignition, in particular immediately after the last self-ignition. Accordingly, the post-injection preferably takes place chronologically before a first spark-ignition.

Advantages also result from the switch-back to the spark-ignition mode according to various embodiments. By a specific introduction of additional fuel in the form of a rich and/or richer mixture, the catalytic converter is cleared of enriched oxygen after the self-ignition mode. At the same time, nitrogen oxides which are produced during a final self-ignition combustion are neutralized.

The post-injection according to various embodiments or enrichment in the transfer phase between modes may be carried out in one or more cycles of the transfer phase. This is, for example, able to be carried out in a final cycle of the self-ignition mode, in a first cycle of the spark-ignition mode or in a plurality of first cycles of the spark-ignition mode. It is also possible according to various embodiments, instead of post-injection in the combustion chamber, to run the first cycle(s) correspondingly rich in the spark-ignition mode, so that the previous lean cycle(s) of the self-ignition mode may be compensated for in terms of pollutants. The number of relevant rich and lean cycles thus again considerably depends on the storage capacity of the exhaust gas cleaning system.

According to various embodiments, the transfer phase between the modes is made up of at least one lean cycle of the self-ignition mode and one rich cycle or a plurality of rich cycles of the spark-ignition mode. According to various embodiments, the lean and the rich cycle(s) of the transfer phase are adjusted to one another so that an average lambda value of the transfer phase preferably of approximately 0.95 to 0.99 results.

During the changeover according to various embodiments from self-ignition CAI mode to spark-ignition SI mode, a post-injection preferably takes place in the final cycle of the CAI mode and/or in at least one subsequent cycle (SI mode/EIC mode), whereby residual oxygen is absorbed by oxidation of the fuel components. In this case, it is preferred that the oxidation of the fuel components has already taken place in the relevant combustion chamber of the internal combustion engine and/or in the exhaust manifold.

If a plurality of rich cycles follow the last lean cycle, it is preferred that the first rich cycle is the richest cycle and then the following cycle(s) are decreasingly enriched, so that the richest cycle is chronologically as close as possible to the lean cycle, and thus the prerequisites are met for efficient mixing of the reaction partners in the exhaust manifold and the catalytic converter contained therein.

According to various embodiments, one cycle or a plurality of cycles which chronologically follow the last cycle of the post-injection, are specifically run rich, in order to clear the catalytic converter of enriched oxygen by a reaction with hydrocarbons and carbon monoxide. As a result, according to various embodiments the capacity for reducing nitrogen oxides is provided.

According to various embodiments, it is possible to undertake a post-injection of fuel according to the above method in just one combustion chamber, in a plurality of combustion chambers or in all combustion chambers of the internal combustion engine. In this case, it is preferred that the post-injection is adjusted so that no active engine torque or no additional engine torque is produced. Moreover, during the post-injection a relevant outlet valve of the combustion chamber may still be closed, or the outlet valve is already open and/or is opened. If additional engine torque is produced due to comparatively early post-injection, it is preferred to compensate for this engine torque by correspondingly adapting the main injection. In other words, preferably less fuel is injected during the relevant main injection than is otherwise usual.

The following embodiments refer to the two transfers according to various embodiments between the self-ignition mode and the spark-ignition mode of the internal combustion engine and vice versa. In other words, the following embodiments refer both to the preparation phase for transfer into the self-ignition mode and the transfer phase from the self-ignition mode to the spark-ignition mode.

According to further embodiments, the pollutants produced by the lean and the rich cycle(s), in particular nitrogen oxides, hydrocarbons and carbon monoxide, preferably already come into contact with one another in the exhaust manifold and are mixed there as soon as possible. Moreover, the pollutants produced are stored in the catalytic converter and neutralized there by catalytic oxidation and/or catalytic reduction. In this case, breakdown of the pollutants through the catalytic converter has to be avoided which applies, in particular, to a breakdown of hydrocarbons when enriching a cycle.

According to further embodiments, the geometric conditions of the entire exhaust gas system, in particular of the exhaust manifold upstream of the catalytic converter and of the catalytic converter itself are intended to be utilized, so that the possibility of direct contact, mixing and the reaction of rich and lean groups of the cycles in the exhaust manifold is optimized. This depends on a number of parameters, such as for example the type of engine (in-line engine, W-engine, V-engine), an exhaust gas system, which may, for example, be double-ported, an upstream/downstream catalytic converter, an exhaust gas valve present, etc. and must accordingly be designed separately for each internal combustion engine.

In particular with multi-cylinder engines, it is preferred that the lean groups of individual cylinders come directly into contact with rich groups of other cylinders in the exhaust manifold downstream of the combustion chambers, whereby an effective mixing of the reaction partners is also achieved upstream of the catalytic converter. This relates, in particular, to a bend in the exhaust manifold. In a conventional ignition sequence of an in-line four cylinder engine, it is preferred that an initiation of the preparation phase and/or the transfer of the modes begins with cylinder four.

According to further embodiments, the internal combustion engine operates chronologically before the preparation phase and/or chronologically after the transfer phase with a substantially stoichiometric fuel ratio, it being preferred that the internal combustion engine operates in EIC mode immediately before the preparation phase and immediately after the transfer phase.

The various embodiments are described hereinafter in more detail with reference to a transfer between modes of an internal combustion engine, in particular from a spark-ignition SI mode or EIC mode to a self-ignition CAI mode, and vice versa. The invention is not intended to be restricted to these modes, but is intended to relate to all spark-ignition and self-ignition modes.

Moreover, the phrase "cycle of the internal combustion engine" is understood hereinafter as four strokes of a four-stroke internal combustion engine. In this connection, one respective box in the drawings represents a cycle which, starting chronologically at the left, starts at a lower dead center point of a piston of a cylinder of the internal combustion engine, an internal pressure of the respective cylinder being plotted in each box in a very simplified manner. A single (SI mode/EIC mode) and/or the highest pressure peak (CAI mode) in one respective box indicates a self-ignition or spark-ignition combustion. A second pressure peak (CAI mode), if present, indicates an intermediate compression.

According to the drawings, each box to the left illustrates the lower dead center point of the piston and initially indicates an ejection of combustion gases as far as an upper dead center point of a change in charge (first stroke); suction as far as a lower dead center point (second stroke); compression as far as an upper dead center point in which spark-ignition or self-ignition takes place (third stroke); and the following working stroke as far as the lower dead center point (fourth stroke), to the right on the respective box and also at the same time to the left on the box which follows to the right.

The steep rise in the internal pressure of the respective cylinder during compression and ignition (point of discontinuity on the left side of the internal pressure) as well as the drop of cylinder internal pressure in the working stroke is clearly visible in the respective box. Moreover, intermediate compression during cycles of the CAI mode may be clearly seen.

According to various embodiments, however, such a cycle may also be defined differently. Thus according to various embodiments it is also possible to identify the first stroke of a cycle as a suction stroke, followed by a compression stroke (second stroke), a working stroke (third stroke) and an ejection stroke (fourth stroke). Regarding this, see in each case a box illustrated in dashed lines in the second cylinder (cylinder 2; n–2, n–1; m–1, m) in the drawings.

Moreover, the phrase "a rich and/or a lean cycle" is intended to be understood as a cycle of a relevant cylinder of the internal combustion engine, the relevant cylinder being operated with a rich or a strong air-fuel mixture ($\lambda<1$) with an absence of air and/or a lean or weak air-fuel mixture ($\lambda>1$) with an excess of air.

Figure 1:
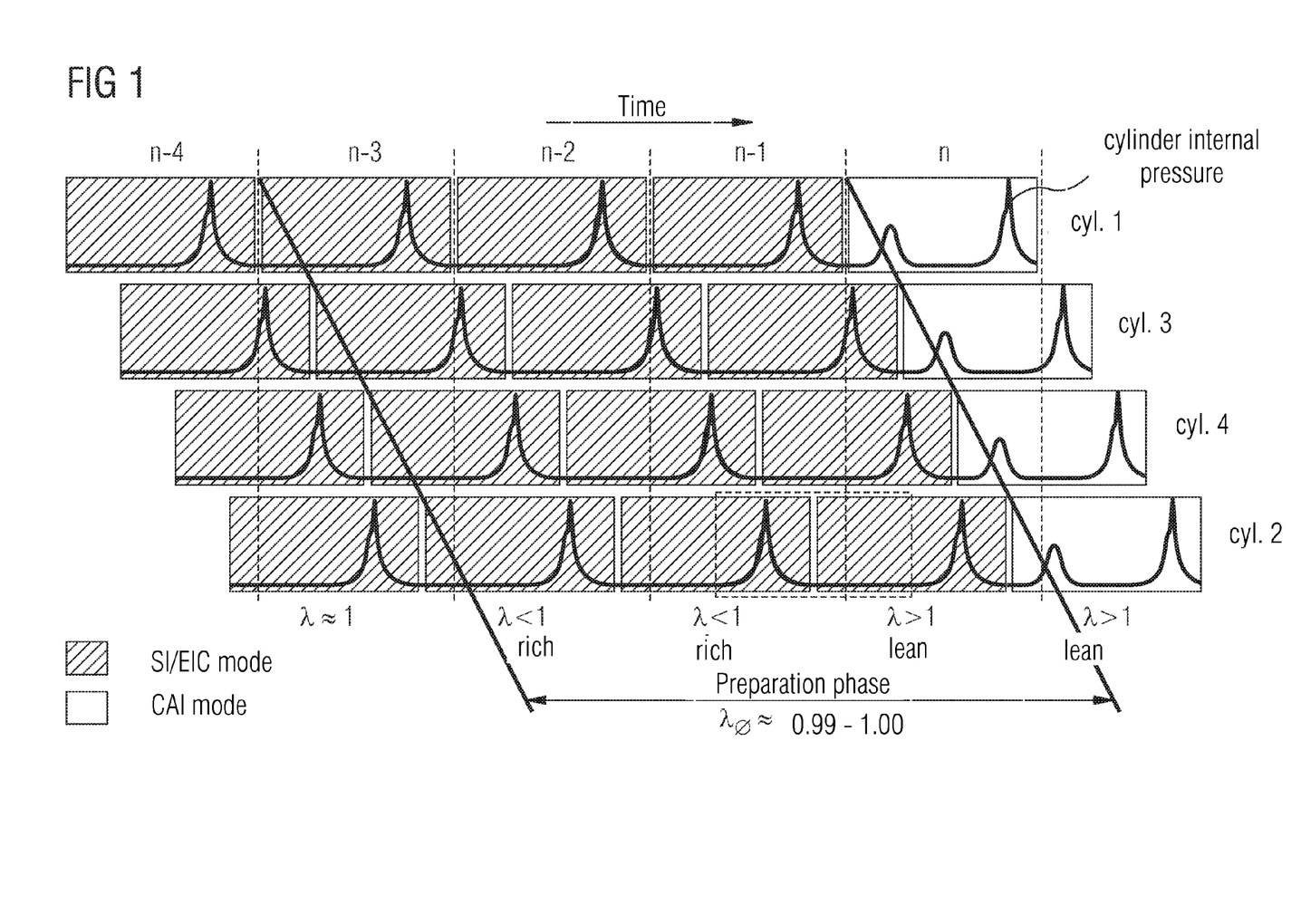
FIG. 1 shows a transfer according to various embodiments of a four-cylinder internal combustion engine from spark-ignition SI mode to self-ignition CAI mode.

In FIG. 1 a transfer and/or transition from the spark-ignition SI mode or EIC mode to the CAI mode is shown in the example of a four-cylinder internal combustion engine. In this case, based on substantially stoichiometric conditions ($\lambda\approx1$) of the air-fuel mixture contained in the relevant cylinder (cycles 1 to 4)—hereinafter denoted as the mixture—is increasingly enriched chronologically after a cycle n–4 up to a cycle n–2. The cycle n–1 is subsequently run lean and in the cycle n a first CAI combustion finally takes place. In the previous cycles chronologically, in particular cycles n–4 to n–1, the internal combustion engine has been accordingly operated in the SI mode/EIC mode.

Figure 2:
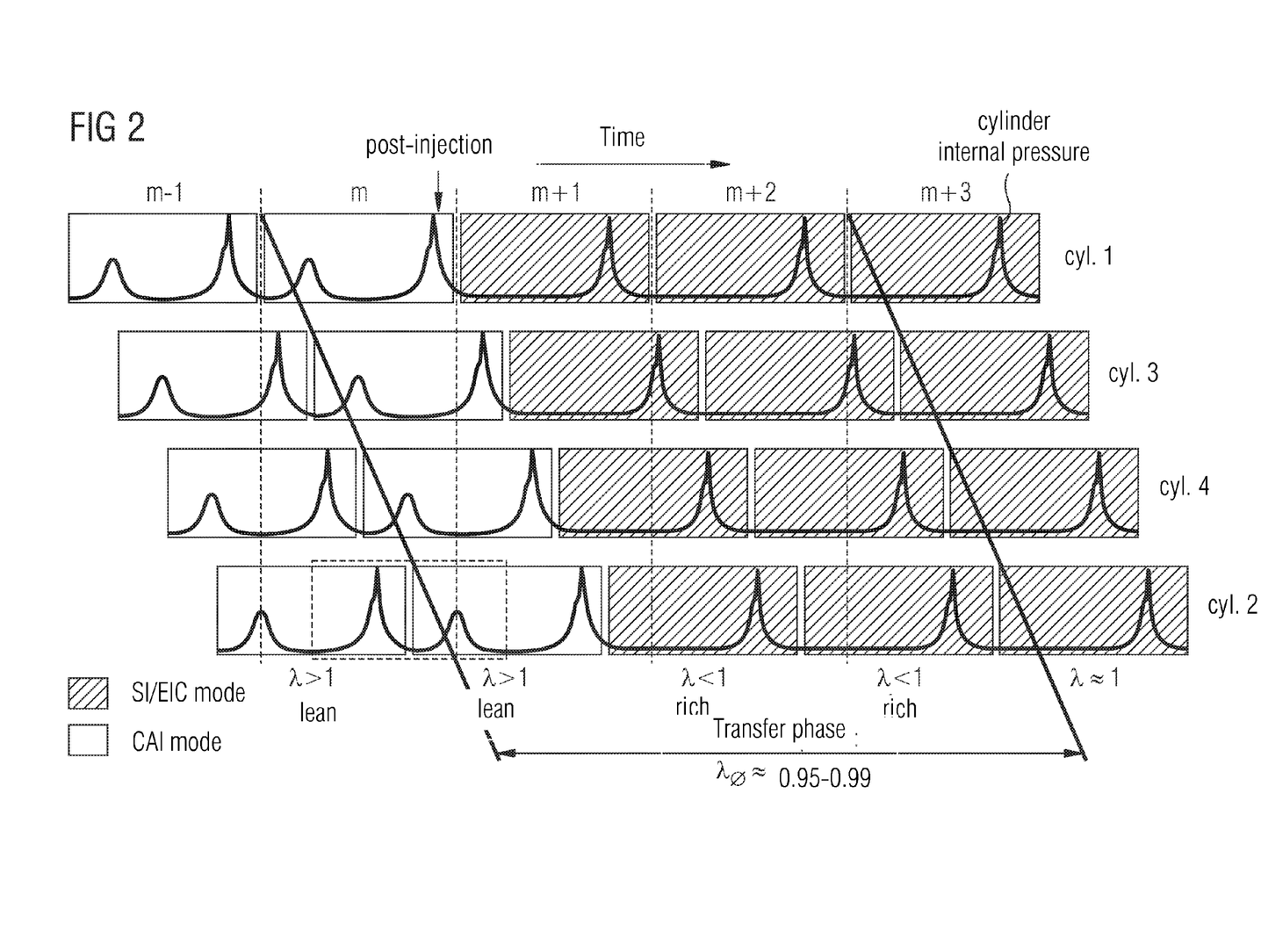
FIG. 2 shows a transfer according to various embodiments from self-ignition CAI mode to spark-ignition SI mode of the four-cylinder internal combustion engine.

FIG. 2 shows the transfer and/or the transition back from the CAI mode into the SI mode or EIC mode. The cycle m–1 thus shows, chronologically, a final conventional CAI-cycle. In cycle m, which is also still a CAI-cycle, a post-injection is carried out after a final CAI-combustion (chronologically the final self-ignition combustion). At the same time, therefore, a changeover to the SI mode/EIC mode takes place and m+1 is a first conventional spark-ignition cycle. An approximate time for the post-injection is indicated by an arrow in cylinder one. Up to cycle m, the internal combustion engine is operated with a lean mixture. In cycles m+1 and m+2, the internal combustion engine is run with a rich mixture, the combustion from cycle m+3 finally taking place again under stoichiometric conditions ($\lambda\approx1$).

Before one respective transfer between modes (FIGS. 1 and/or 2), for reasons of comfort (torque neutrality) and combustion technology (residual gas temperature for the CAI mode (FIG. 1)) a series of operating parameters of the internal combustion engine have to be maintained. These are, in particular, throttle flap angle, time of injection and injection timing, ignition angle (SI mode/EIC mode) as well as inlet and outlet camshaft position.

The following considerations refer to an individual cylinder of an internal combustion engine, multi-cylinder engines accordingly being able to be run cylinder-selectively, but in principle being able to be run identically; as is shown in FIGS. 1 and 2 with reference to the sequences of the cylinder internal pressures, shown schematically here of the four-cylinder internal combustion engine.

Hereinafter, the transfer from the SI mode/EIC mode to the CAI mode according to FIG. 1 is explained in more detail.

The cycle of the first CAI-combustion is denoted by n, and n–1 is thus the last cycle in the SI mode/EIC mode, in which the disclosed operating parameters preparing for the changeover are active. As, chronologically, the preparation for transferring between modes generally takes into account more than one cycle due to the inertia of components, such as a throttle flap or a camshaft phase shifter, the transfer and/or changeover process has to be initiated correspondingly early.

Chronologically, the preparation of the transfer is indicated in FIG. 1 by oblique lines over all pressure curves and identifies a preparation phase during the SI mode/EIC mode of the internal combustion engine, the preparation phase being terminated before the actual transfer to the CAI mode.

At least the last cycle n–1 before the transfer is deliberately run lean for reducing the exhaust gas temperature, and is thus responsible for the increased formation of nitrogen oxide. In this connection, it should be noted that it is advantageous to run this last cycle n–1 or these last cycles with a quantity of excess air ($\lambda>1$) which is as large as possible in order to maintain a residual gas temperature which is as low as possible and adapted to the relatively cold CAI-combustion.

According to various embodiments, this additional formation of nitrogen oxide of the internal combustion engine is compensated for, during the preparation phase for the transfer between modes, by a separate rich cycle or a plurality of rich cycles n–2, n–3 being arranged upstream of the lean cycle n–1. The hydrocarbon and carbon monoxide molecules produced during combustion of the rich mixture then pass via the exhaust manifold to the catalytic converter (exhaust gas cleaning device) and are stored there.

If the nitrogen oxide molecules from the lean combustion reach the subsequent cycles, an oxidation of the hydrocarbons and of the carbon monoxide takes place, as well as a reduction of the nitrogen oxides by a catalytic effect within the catalytic converter.

The number of rich and lean combustion cycles as well as the air-fuel ratio $\lambda$ is dependent on an engine operation point as well as the nature and size of the exhaust manifold and of the catalytic converter. A breakdown of the pollutants, in particular a hydrocarbon breakdown has to be avoided. According to various embodiments, fuel metering thus has to be designed so that for the entire preparation phase and/or the entire changeover process a lambda value $\lambda$ of preferably approximately 0.99 to approximately 1.00 results.

In the event that a plurality of rich cycles are necessary, in order to generate the hydrocarbon and carbon monoxide molecules necessary for reducing the nitrogen oxide, it is advantageous to make the cycle n–2 as rich as possible and to make the previous cycles (n–3, n–4, etc.) gradually lean (in the opposite direction to a time arrow) in the direction of a lambda value $\lambda$ of approximately 1. As a result, the richest rich group and the lean group are positioned chronologically behind one another, whereby the prerequisites for effective mixing and the reaction capability of the pollutant components in the exhaust manifold are improved.

Generally, it is preferred that the rich and lean groups of the internal combustion engine have already come into contact upstream of the catalytic converter, and are already mixed and also may react there. In multi-cylinder internal combustion engines, ideally lean exhaust gas groups come into contact with rich groups of the neighboring cylinder positioned chronologically before. Thus a chemical reaction preferably takes place directly in the exhaust manifold upstream of the catalytic converter. It is generally also advantageous to utilize the geometric conditions of the entire exhaust gas system.

This is intended to be explained in brief by the example of an in-line four-cylinder internal combustion engine. A conventional ignition sequence of cylinders one, three, four, two, as shown in the drawings, is assumed. Cylinder one is thus the front cylinder in a longitudinally mounted engine.

According to various embodiments, it is advantageous to begin the transfer between modes with cylinder four and accordingly to provide the first lean group, as there is then the possibility of mixing this lean group with the rich group which is provided of all remaining three cylinders. Moreover, in the following cylinder two, mixing may take place with the rich group of cylinder one. As such effects occur in a manner which is very system-specific, the optimal procedure in each individual case has to be determined.

In a three-way catalytic converter, the following chemical reactions of the pollutants produced in the preparation phase (hydrocarbons CH, carbon monoxide CO and nitrogen oxides $NO_x$ (NO, $NO_2$) take place:

Oxidation of CO and HC to $CO_2$ and $H_2O$:

$$C_yH_n + \left(1 + \frac{n}{4}\right)O_2 \Rightarrow yCO_2 + \frac{n}{2}H_2O$$

$$CO + \frac{1}{2}O_2 \Rightarrow CO_2$$

$$CO + H_2O \Rightarrow CO_2 + H_2$$

Reduction of NO, $NO_2$ to $N_2$:

$$NO(\text{or } NO_2) + CO \Rightarrow \frac{1}{2}N_2 + CO_2$$

$$NO(\text{or } NO_2) + H_2 \Rightarrow \frac{1}{2}N_2 + H_2O$$

$$\left(2 + \frac{n}{2}\right)NO(\text{or } NO_2) + C_yH_n \Rightarrow \left(1 + \frac{n}{4}\right)N_2 + yCO_2 + \frac{n}{2}H_2O$$

The transfer from CAI mode to SI mode/EIC mode according to FIG. 2 is described in more detail hereinafter.

In order to pass from the CAI mode shown in FIG. 2 back to the SI mode/EIC mode, in principle no particular thermodynamic measures are necessary. Nevertheless, during the switch-back a positive influence may also be had on the emissions behavior of the internal combustion engine.

After the last CAI-combustion in cycle m, preferably a changeover is made on the outlet side to a large valve lift, in order to rinse lean residual gas from the relevant cylinder. According to various embodiments, in cycle m, i.e. chronologically the final CAI-cycle, a post-injection (arrow in cylinder one) into the relevant combustion chamber of the internal combustion engine is carried out, whereby residual oxygen may be absorbed.

Ideally, oxidation still takes place in the combustion chamber, i.e. when the outlet valve is still closed. In the embodiments it is, however, possible that the outlet valve has already been opened. In this case, for comfort reasons it is necessary to ensure that by the post-injection no active moment is contributed. The post-injection may potentially be carried out late, therefore, so that the relevant outlet valve is already open. In such a case, the reaction of the pollutants only takes place partially in the combustion chamber but mainly in the exhaust manifold located downstream.

According to various embodiments, however, it is possible in embodiments to undertake the post-injection early, i.e. shortly after the self-ignition, so that further torque of the internal combustion engine is generated by the post-injection.

Such an additional torque has to be compensated for in order to be able to maintain the required torque neutrality. According to various embodiments, this is carried out so that, as a result of a main injection which may be divided up into a plurality of individual injections, correspondingly less torque is generated. In other words, the torque generated by the post-injection is compensated for by less fuel being introduced during the main injection.

The cycles which immediately follow one another chronologically are run with a lack of oxygen ($\lambda<1$). The excess hydrocarbon and carbon monoxide molecules are oxidized with the oxygen molecules stored during the lean CAI mode in the catalytic converter, and the catalytic converter is cleared. This is all the more necessary as carbon monoxide molecules preferably react with oxygen and the reduction of nitrogen oxides is restricted. This method is also able to be adapted to the nature and size of the exhaust manifold and the exhaust gas cleaning device (oxygen storage capacity).

FIG. 2 shows a transfer phase from the CAI mode to the SI mode/EIC mode, which in the present exemplary embodiment extends over three cycles m to m+2, and is indicated again with oblique lines over all pressure curves. A number of these cycles is naturally able to be varied. The last cycle of the CAI mode is still lean overall in spite of the post-injection, and run with a lambda value $\lambda$ of approximately 1.1 to approximately 1.2. The post-injection takes place after the final self-ignition and chronologically before the intermediate compression and/or chronologically before closing the outlet valve.

The first spark-ignition SI-cycle/EIC-cycle m+1 follows the cycle m. This cycle m+1 is run rich, preferably run with a lambda value $\lambda$ which is as low as possible of approximately (0.7) 0.8 to approximately 0.9. The subsequent cycles m+2 (m+3) of the SI mode/EIC mode of the internal combustion engine are then run less rich, the cycle m+3 chronologically downstream being run less rich than the cycle m+2 chronologically upstream. According to various embodiments, therefore, the richest rich cycle directly follows the last lean cycle m of the CAI mode. In the subsequent cycles m+3 (m+4), etc. the internal combustion engine is again operated with a lambda value $\lambda$ of approximately 1.

According to further embodiments, the post-injection takes place depending on the load of the internal combustion engine. In principle, a relatively large post-injection in terms of volume relates to a high load and a relatively small post-injection in terms of volume relates to a small load. In this connection, the post-injections in each case may be adapted in their volumes to the load of the internal combustion engine more or less continuously. Moreover, it is possible from a specific limit and/or a specific threshold to carry out a post-injection (high load) or not (small load). Moreover, it is possible to use a plurality of post-injections of different-sized volumes, depending on the load.

What is claimed is:

1. A method for an emission-optimized transfer between a spark-ignition mode of an internal combustion engine and a self-ignition mode of the internal combustion engine, the method comprising:
   operating a cylinder of the internal combustion engine in a preparation phase before the transfer of modes in a spark-ignition mode including:
     operating for at least one cylinder cycle with a rich mixture;
     subsequently, operating the cylinder for at least one cycle with a lean mixture, and
   subsequently, operating the internal combustion engine in the self-ignition mode.

2. The method according to claim 1, wherein the preparation phase includes two or three cycles with a rich mixture, dependent on characteristics of a catalytic converter.

3. The method according to claim 1, wherein the preparation phase includes no more than two cycles with a lean mixture, dependent on characteristics of a catalytic converter.

4. The method according to claim 1, wherein in the respective cycles of the preparation phase a relevant lambda value of the internal combustion engine is selected so that for the entire preparation phase an average lambda value of approximately 0.95 to approximately 1.04 results.

5. The method according to claim 1, wherein a quantity of fresh air introduced into the internal combustion engine is considered when determining the average lambda value.

6. The method according to claim 1, wherein in at least one portion of the cycles of the preparation phase, in which the internal combustion engine is operated with a rich mixture, a lambda value of the relevant cycle is approximately 0.7 to approximately 0.95.

7. The method according to claim 1, wherein said rich cycle of the preparation phase, which immediately precedes a lean cycle, is run with a mixture which is at least one of richer than a mixture in a previous rich cycle and as rich as possible.

8. The method as according to claim 1, wherein in a cycle of the preparation phase in which the internal combustion engine is operated with a lean mixture, a lambda value of the relevant cycle is greater than approximately 1.3.

9. The method according to claim 1, wherein the final cycle chronologically of the preparation phase is run with a lean mixture so that for a subsequent combustion in the self-ignition mode a residual gas temperature is achieved which is as optimal as possible.

10. The method according to claim 9, wherein at least one of the smooth-running of the internal combustion engine is considered and misfires avoided, when setting a residual gas temperature.

11. The method according to claim 1, wherein a lambda value of a cycle, which chronologically precedes the preparation phase, is approximately 1.0.

12. A method for an emission-optimized transfer between a self-ignition mode of an internal combustion engine, and a spark-ignition mode of the internal combustion engine, the method comprising:
   operating a cylinder of the internal combustion engine in a transfer phase;
   the transfer phase including a final cycle of the self-ignition mode and a first cycle of the spark-ignition mode;
   wherein fuel is post-injected into at least one combustion chamber of the internal combustion engine during the transfer phase.

13. The method according to claim 12, wherein a post-injection of fuel takes place chronologically after a final self-ignition.

14. The method according to claim 12, wherein the post-injection of fuel into the combustion chamber is adjusted to achieve at least one of the options chosen from the group consisting of:
   residual oxygen is partially absorbed by an oxidation of fuel components already in the combustion chamber,
   residual oxygen is at least partially absorbed in an exhaust manifold of the internal combustion chamber,
   by the post-injection no active contribution to the torque of the internal combustion engine is made,
   the post-injection takes place in a manner which is neutral in terms of torque, and
   at the start of the post-injection an outlet valve of the combustion chamber is still closed or already open.

15. The method according to claim 12, wherein a contribution by the post-injection to a torque of the internal combustion engine is compensated for by modifying the main injection.

16. The method according to claim 12, wherein the transfer phase includes no more than two cycles in which the internal combustion engine is operated with a lean mixture dependent on characteristics of a catalytic converter.

17. The method according to claim 12, wherein the transfer phase includes two or three cycles in which the internal combustion engine is operated with a rich mixture dependent on characteristics of a catalytic converter.

18. The method according to claim 12, wherein in the respective cycles of the transfer phase a relevant lambda value of the internal combustion engine is selected so that for the entire transfer phase an average lambda value of approximately 0.93 to approximately 1.0 results.

19. The method according to claim 12, wherein a quantity of fresh air introduced into the internal combustion engine is considered when determining the average lambda value.

20. The method according to claim 12, wherein a lambda value of the last lean cycle of the self-ignition mode is approximately 1.1 to approximately 1.2.

21. The method according to claim 12, wherein a lambda value of a first rich cycle of the transfer phase is as low as possible, and is approximately 0.7 to 0.9.

22. The method according to claim 12, wherein at least one cycle of the transfer phase which chronologically follows the first rich cycle is operated with a rich mixture, and a lambda value is preferably higher than that of the previous rich cycle, and is approximately 0.8 to approximately 0.95.

23. The method according to claim 12, wherein a lambda value of a cycle, which chronologically follows the transfer phase, is approximately 1.0.

24. The method according to claim 1, wherein the combustion products produced by at least one rich cycle and at least one lean cycle in the preparation phase come into contact in an exhaust manifold of the internal combustion engine and are at least partially mixed there.

25. The method according to claim 1, wherein an adjustment of the at least one rich cycle and of the at least one lean cycle of the preparation phase is adapted to a characteristic of at least one of an exhaust gas cleaning device and the exhaust manifold.

26. The method according to claim 1, wherein an exhaust manifold of the internal combustion engine is formed in a portion upstream of an exhaust gas cleaning device so that combustion products of at least one of different cylinders and successive cycles are mixed there.

27. The method according to claim 1, wherein a rich cycle and a lean cycle of the of preparation phase of a cylinder or a plurality of cylinders of the internal combustion engine are adjusted so that the combustion products produced come into contact with one another as early as possible in an exhaust manifold.

28. The method according to claim 1, wherein the rich cycle and the lean cycle of the preparation phase are adjusted so that there is no breakdown of at least one material chosen from the group consisting of: carbon monoxide, hydrocarbons, and nitrogen oxides; downstream of the exhaust gas cleaning device.

29. The method according to claim 1, wherein the pollutants produced during the preparation phase are neutralized by reacting with one another in a catalytic converter.

30. The method according to claim 1, wherein the internal combustion engine operates of during the preparation phase in an EIC mode.

31. The method according to claim 1, wherein with a conventional ignition sequence of a four-cylinder internal combustion engine of cylinders one, three, four and two, the at least one of preparation phase and the transfer of the modes are initiated chronologically first in cylinder four.

32. A control unit for use in an internal combustion engine, the control unit comprising:
- a processor in communication with various ignition components of the internal combustion engine;
- a memory in communication with the processor;
- wherein the processor operates to transfer the internal combustion engine from a spark-ignition mode to a self-ignition mode by operating the internal combustion engine according to instructions stored in the memory, the instructions including the steps of:
  - operating a cylinder of the internal combustion engine in a spark-ignition mode for at least one cycle with a rich mixture;
  - subsequently, operating the cylinder for at least one cycle with a lean mixture; and
  - subsequently, operating the internal combustion engine in the self-ignition mode.

* * * * *